US007012046B2

(12) United States Patent
Eaton et al.

(10) Patent No.: US 7,012,046 B2
(45) Date of Patent: *Mar. 14, 2006

(54) DRAG REDUCING AGENT SLURRIES HAVING ALFOL ALCOHOLS AND PROCESSES FOR FORMING DRAG REDUCING AGENT SLURRIES HAVING ALFOL ALCOHOLS

(76) Inventors: Gerald B. Eaton, 16222 Delozier, Houston, TX (US) 77040; Alan K. Ebert, 7723 Granite Ridge La., Houston, TX (US) 77095

(*) Notice: Subject to any disclaimer, the term of this patent is extended or adjusted under 35 U.S.C. 154(b) by 423 days.

This patent is subject to a terminal disclaimer.

(21) Appl. No.: 09/877,341

(22) Filed: Jun. 8, 2001

(65) Prior Publication Data

US 2002/0198116 A1 Dec. 26, 2002

(51) Int. Cl.
C10M 107/00 (2006.01)
C10M 129/06 (2006.01)
F17D 1/17 (2006.01)

(52) U.S. Cl. .................. 508/583; 508/591; 585/3; 585/10; 137/13; 523/175

(58) Field of Classification Search ................ 137/13; 523/175, 309; 508/591, 583
See application file for complete search history.

(56) References Cited

U.S. PATENT DOCUMENTS

| 3,542,044 A | 11/1970 | Hanson et al. |
| 3,645,822 A | 2/1972 | Widiger et al. |
| 3,669,948 A | 6/1972 | Konotsune et al. |
| 3,692,676 A | 9/1972 | Cutler et al. |
| 3,730,275 A | 5/1973 | McClaflin et al. |
| 3,736,288 A | 5/1973 | Stratta et al. |
| 3,767,561 A | 10/1973 | Rossi et al. |
| 3,791,913 A | 2/1974 | Ver Strate et al. |
| 3,843,589 A | 10/1974 | Wartman |
| 3,857,795 A | 12/1974 | Van Der Bend et al. |
| 3,884,252 A | 5/1975 | Kruka |
| 3,944,529 A | 3/1976 | Creemers |
| 3,951,935 A | 4/1976 | Engelmann |
| 4,057,680 A | 11/1977 | Yamazaki et al. |
| 4,142,991 A | 3/1979 | Arzoumanidis et al. |
| 4,147,677 A | 4/1979 | Lundberg et al. |
| 4,190,069 A | 2/1980 | Krantz |
| 4,212,312 A | 7/1980 | Titus |
| 4,262,104 A | 4/1981 | Wristers |
| 4,263,926 A | 4/1981 | Drake et al. |
| 4,267,292 A | 5/1981 | Benton et al. |
| 4,282,114 A | 8/1981 | Ito et al. |
| 4,289,679 A | 9/1981 | Mack |
| 4,294,947 A | 10/1981 | Doerk et al. |
| 4,329,253 A | 5/1982 | Goodall et al. |
| 4,333,488 A | 6/1982 | McClaflin |
| 4,335,964 A | 6/1982 | Drake et al. |
| 4,340,076 A | 7/1982 | Weitzen |
| 4,358,572 A | 11/1982 | Mack et al. |
| 4,371,455 A | 2/1983 | Mack et al. |
| 4,384,089 A | 5/1983 | Dehm |
| 4,393,182 A | 7/1983 | Goodall et al. |
| 4,395,358 A | 7/1983 | Wristers |
| 4,415,714 A | 11/1983 | Mack |
| 4,426,317 A | 1/1984 | Rogers |
| 4,433,123 A | 2/1984 | Mack |
| 4,478,951 A | 10/1984 | Huff |
| 4,485,186 A | 11/1984 | Ueno et al. |
| 4,493,903 A | 1/1985 | Mack |
| 4,493,904 A | 1/1985 | Mack |
| 4,522,982 A | 6/1985 | Ewen |
| 4,539,374 A | 9/1985 | Fenton et al. |
| 4,584,244 A | 4/1986 | Fenton |
| 4,642,410 A | 2/1987 | Loveless |
| 4,656,204 A | 4/1987 | Duvdevani et al. |
| 4,659,685 A | 4/1987 | Coleman, III et al. |
| H316 H | 8/1987 | Kowalik et al. |
| 4,693,321 A | 9/1987 | Royer |
| 4,713,444 A | 12/1987 | Matsuyama et al. |
| 4,720,397 A | 1/1988 | O'Mara et al. |
| 4,724,255 A | 2/1988 | Lofgren et al. |
| 4,756,326 A | 7/1988 | Johnston |
| 4,758,354 A | 7/1988 | O'Mara et al. |
| 4,771,799 A | 9/1988 | Baxter et al. |
| 4,771,800 A | 9/1988 | Pomeroy |
| 4,789,383 A | 12/1988 | O'Mara et al. |
| 4,797,461 A | 1/1989 | Aubanel et al. |
| 4,826,728 A | 5/1989 | O'Mara et al. |
| 4,837,249 A | 6/1989 | O'Mara et al. |

(Continued)

FOREIGN PATENT DOCUMENTS

CA  901727  5/1972

(Continued)

OTHER PUBLICATIONS

John Boor, Jr., Ziegler-Natta Catalysts and Polymerizations, 1979, Chapter 18: Kinetics, pp. 464-511, Academic Press, New York, USA.

(Continued)

Primary Examiner—Ellen M. McAvoy
(74) Attorney, Agent, or Firm—Andrews Kurth LLP; Anthony F. Matheny

(57) ABSTRACT

A composition including a polyalphaolefin and at least one alfol alcohol that function as drag reducing agent slurries and a process for the preparation of the drag reducing agent slurries are disclosed. The process includes contacting alpha olefin monomers with a catalyst in a reactant mixture to form a polyalphaolefin. The polyalphaolefin is combined with at least one alfol alcohol to form a drag reducing agent slurry. A process for reducing drag in a conduit is also disclosed.

22 Claims, No Drawings

U.S. PATENT DOCUMENTS

| | | |
|---|---|---|
| 4,845,178 A | 7/1989 | Hostetler et al. |
| 4,881,566 A | 11/1989 | Ubels et al. |
| 4,900,461 A | 2/1990 | Ver Strate et al. |
| 4,940,682 A | 7/1990 | Sasaki et al. |
| 4,945,142 A | 7/1990 | Gessell et al. |
| 4,952,738 A | 8/1990 | Gessell et al. |
| 4,959,436 A | 9/1990 | Cozewith et al. |
| 5,070,160 A | 12/1991 | Tomotsu et al. |
| 5,080,121 A | 1/1992 | Malik et al. |
| 5,081,087 A | 1/1992 | Villena et al. |
| 5,104,839 A | 4/1992 | McDaniel et al. |
| 5,122,584 A | 6/1992 | Takahashi |
| 5,151,399 A | 9/1992 | Job |
| 5,162,277 A | 11/1992 | Job |
| 5,165,441 A | 11/1992 | Mitchell |
| 5,238,892 A | 8/1993 | Chang |
| 5,241,025 A | 8/1993 | Hlatky et al. |
| 5,243,001 A | 9/1993 | Winter et al. |
| 5,244,937 A | 9/1993 | Lee et al. |
| 5,276,116 A | 1/1994 | Gessell |
| 5,276,220 A | 1/1994 | Samsel et al. |
| 5,278,264 A | 1/1994 | Spaleck et al. |
| 5,298,474 A | 3/1994 | Luciani et al. |
| 5,298,579 A | 3/1994 | Hoff et al. |
| 5,304,614 A | 4/1994 | Winter et al. |
| 5,310,716 A | 5/1994 | Luciani et al. |
| 5,320,994 A | 6/1994 | Bujadoux et al. |
| 5,326,835 A | 7/1994 | Ahvenainen et al. |
| 5,328,969 A | 7/1994 | Winter et al. |
| 5,348,925 A | 9/1994 | Milani et al. |
| 5,349,032 A | 9/1994 | Miyake et al. |
| 5,350,817 A | 9/1994 | Winter et al. |
| 5,356,848 A | 10/1994 | Brusson et al. |
| 5,359,015 A | 10/1994 | Jejelowo |
| 5,364,994 A | 11/1994 | Scharf |
| 5,373,072 A | 12/1994 | Chang |
| 5,374,752 A | 12/1994 | Winter et al. |
| 5,376,697 A | 12/1994 | Johnston et al. |
| 5,384,298 A | 1/1995 | Inahara et al. |
| 5,395,810 A | 3/1995 | Shamshoum et al. |
| 5,416,178 A | 5/1995 | Winter et al. |
| 5,416,179 A | 5/1995 | Welch et al. |
| 5,434,115 A | 7/1995 | Yamoda et al. |
| 5,436,212 A | 7/1995 | Geerts |
| 5,442,019 A | 8/1995 | Agapiou et al. |
| 5,449,732 A | 9/1995 | Smith et al. |
| 5,480,849 A | 1/1996 | Gustafsson et al. |
| 5,480,948 A | 1/1996 | Geerts |
| 5,504,131 A | 4/1996 | Smith et al. |
| 5,504,132 A | 4/1996 | Smith et al. |
| 5,521,242 A | 5/1996 | Supcoe et al. |
| 5,539,044 A | 7/1996 | Dindi et al. |
| 5,541,270 A | 7/1996 | Chinh et al. |
| 5,574,116 A | 11/1996 | Bujadoux et al. |
| 5,585,447 A | 12/1996 | Adisson et al. |
| 5,604,171 A | 2/1997 | Collette et al. |
| 5,639,842 A | 6/1997 | Tsutsui |
| 5,644,007 A | 7/1997 | Davidson et al. |
| 5,668,228 A | 9/1997 | Chinh et al. |
| 5,705,577 A | 1/1998 | Rossi et al. |
| 5,710,224 A | 1/1998 | Alt et al. |
| 5,712,365 A | 1/1998 | Arai et al. |
| 5,728,855 A | 3/1998 | Smith et al. |
| 5,733,953 A | 3/1998 | Fairchild et al. |
| 5,858,904 A | 1/1999 | Takeuchi et al. |
| 5,869,570 A | 2/1999 | Eaton et al. |
| 5,932,670 A | 8/1999 | Koppl et al. |
| 6,015,779 A | 1/2000 | Eaton et al. |
| 6,126,872 A | 10/2000 | Kommareddi et al. |
| 6,160,036 A | 12/2000 | Kommareddi et al. |
| 6,162,773 A | 12/2000 | Eaton et al. |
| 6,172,151 B1 | 1/2001 | Johnston et al. |
| 6,178,980 B1 | 1/2001 | Storm |
| 6,242,395 B1 | 6/2001 | Eaton et al. |
| 6,399,676 B1 * | 6/2002 | Labude et al. ............ 523/309 |

FOREIGN PATENT DOCUMENTS

| | | |
|---|---|---|
| EP | 0005215 A | 11/1979 |
| EP | 0108156 A | 5/1984 |
| EP | 0196350 A1 | 8/1986 |
| EP | 0196350 B1 | 11/1989 |
| EP | 0535230 A | 4/1993 |
| EP | 0292797 A | 11/1998 |
| GB | 2074175 A | 10/1981 |
| GB | 2093466 | 9/1982 |
| WO | WO 95/00563 | 1/1995 |

OTHER PUBLICATIONS

Tad W. Taylor, et al., Physiochemical Kinetics of Liquid Phase Propylene Polymerization, pp. 191-223, Eleventh Midland Macromolecular Meeting, Aug. 17-21, 1981, MMI Press, Midland, Michigan, USA.

B.M. Grieveson, Kinetics of the Polymerization of Ethylene with a Ziegler-Natta Catalyst, 1965, Die Makromolekulare Chemie, vol. 84, pp. 93-107.

Lutz Wohlfarth, Alternating Copolymerization of Butadiene and Propene with the VO9ONeo)2Cl/Al(iso-Bu)3 System 2: Influence of Electron Donors at a Polymerization Temperature of -45 C, 1991, Paste and Kautschuk, vol. 38, No. 9, pp. 297-299 (translation pp. 1-7).

English Language Abstract of Japanese patent application entitled "Preparation of Ethylene-Alpha-Olefin Copolymer," dated May 14, 1990.

Miscellaneous Patent Summary, pp. 1-118.
Miscellaneous Patent Search, pp. 1-77.
Miscellaneous Patent Search, pp. 1-204.

* cited by examiner

DRAG REDUCING AGENT SLURRIES HAVING ALFOL ALCOHOLS AND PROCESSES FOR FORMING DRAG REDUCING AGENT SLURRIES HAVING ALFOL ALCOHOLS

BACKGROUND OF THE INVENTION

1. Field of the Invention

This invention relates to drag reducing agent slurries, and in particular, drag reducing agent slurries having alfol alcohols used in methods for improving flow of hydrocarbons through conduits, particularly pipelines. The invention also relates to methods for making drag reducing agent slurries.

2. Description of Related Art

Generally speaking, the flow of liquid in a conduit, such as a pipeline, results in frictional energy losses. As a result of this energy loss, the pressure of the liquid in the conduit decreases along the conduit in the direction of the flow. For a conduit of fixed diameter, this pressure drop increases with increasing flow rate. When the flow in the conduit is turbulent (Reynold's number greater than about 2100), certain high molecular weight polymers can be added to the liquid flowing through the conduit to reduce the frictional energy losses and alter the relationship between pressure drop and flow rate. These polymers are sometimes referred to as drag reducing agents ("DRAs"), and they interact with the turbulent flow processes and reduce frictional pressure losses such that the pressure drop for a given flow rate is less, or the flow rate for a given pressure drop is greater. Because DRAs reduce frictional energy losses, increase in the flow capability of pipelines, hoses and other conduits in which liquids flow can be achieved. DRAs can also decrease the cost of pumping fluids, the cost of equipment used to pump fluids, and provide for the use of a smaller pipe diameter for a given flow capacity.

One type of drag reducing agent presently utilized is a slurry. Drag reducing agent slurries are those formed by polymerizing monomers, preferably alpha olefin monomers, to form polymers that are subsequently ground to a small size and suspended in a liquid vehicle, i.e. suspending agent. Drag reducing agent slurries facilitate the rapid dispersion of the drag reducing agent through out the hydrocarbon being transported through a conduit. While various polymerization methods, reactants, partitioning agents, and slurries have been published in the patent literature, many of those methods include components of drag reducing agent slurries that increase the cost of production of the drag reducing agents slurry. Further, some components of drag reducing agent slurries cannot be removed from the hydrocarbon after they have been introduced into the conduit. In many, if not all instances, these slurry components remaining in the hydrocarbon foul the hydrocarbon in the conduit, thereby decreasing the number of uses of the hydrocarbon and/or the effectiveness of the use of the hydrocarbon.

Generally, water soluble alcohols, water, glycols, glycerin, and water/water-soluble alcohol mixtures (referred to herein as "water-alcohol mixtures") are known in the art as being suspending materials. All of these prior attempts have shortcomings. For example, the addition of water poses serious implications as it relates to water contamination, i.e., hazing, of motor fuel, e.g., gasoline, diesel, and kerosene, in pipelines. Other significant problems associated with the inclusion of water in the drag reducing agent slurries include additional wastewater generation, thereby requiring disposal, increased systems corrosion, increased biological activity in "free-water" fallout areas within the pipeline and terminal storage tanks.

In other prior drag reducing agent slurries, small amounts of polar and/or other water soluble alcohols have been linked with serious biological upsets and resulting operational problems due, in part, to food to microorganism balances, undesirable biological facilitation, excessive biological oxygen demand and chemical oxygen demand loading, and bio-mass bulking within various refineries' activated sludge processes. These refineries depend on activated sludge processes as the most practical and efficient means of treating wastewater received and generated within the refining processes prior to its reintroduction, or discharge outside of, the refineries. In fact, some refineries have set strictly enforced limits on drag reducing agents slurries containing water soluble alcohols, glycols, and glycerins received into their refineries from crude oil pipelines.

Additionally, the inclusion of water, glycols, glycerin, and water-alcohol mixtures as a part of, or as the entire, suspending agent, generally requires the inclusion of other components, thereby increasing the cost of formation of the drag reducing agent, increasing potential harm to refineries, and increasing cost of refining the hydrocarbon due to the cost of removal and disposal of these additives. For example, surfactants, e.g., nonylphenol ethyoxylate, alkaline metal stearates, e.g., magnesium stearate and calcium stearate used as partitioning agents to reduce the potential of the finely ground polymer solids from re-agglomerating and thus destabilizing the drag reducing agent slurry, and biocides are included in some prior drag reducing agent slurries. Some refineries have prohibited the use of drag reducing agent slurries containing surfactants and metal stearates in their crude oil pipeline because, upon entering the refining facilities, the surfactants and alkaline metal stearates are believed to be responsible for upset the refining process, including the refineries vital desalting processes.

Siloxane containing antifoams are also usually included in prior drag reducing agent slurries to reduce or eliminate the potential of foaming within the end user's pipeline system following the addition of drag reducing agent slurry. Siloxane containing antifoams are objectionable components because they are believed to be responsible for causing deleterious effects on various refining processes and facilitate fouling within the refining process.

Generally, all of these additional components are insoluble contaminants in the hydrocarbon stream in the pipeline. Such contaminants are undesirable and the art has continually sought a drag reducing agent slurry that excludes these undesirable components.

Another disadvantage of the prior drag reducing agent slurries is that the "shelf-life" of these drag reducing agent slurries are extremely short and they require storage within strict temperature ranges. For example, one prior drag reducing agent slurry containing water and water-alcohol mixtures as the suspending agent requires its storage to be within expensive temperature controlled housing/containment, or container/building, to help insure its usability and stability, (i.e. between 35–85° F.). Without proper temperature control in such a storage facility this prior drag reducing agent slurry becomes frozen at or near the freezing point of water, or microbiologically decomposes and destabilizes/ferments in an unacceptably short time as ambient temperatures move above 90° F. As known to persons skilled in the art, a large portion of crude oil is produced in extremely hot regions of the world, e.g., Saudi Arabia, Venezuela, Texas, Mexico, and Gulf of Mexico, and extremely cold regions of the world, e.g., Alaska, Siberia, and Canada. Accordingly, these prior drag reducing agent slurries are not suitable for use in these environments without additional storage facilities.

Another shortcoming of prior drag reducing agent slurries is that the polymer load per gallon, i.e., the amount of active polymer that can be suspended in a gallon of suspending agent without the polymer particles re-agglomerating, is limited. Applicants are unaware of any drag reducing agent slurry that contains greater than about 2.0 pounds of this polymer per gallon of suspending material. Addition of polymer in amounts greater than about 2.0 pounds of polymer per gallon results in an extremely viscous and unstable drag reducing agent slurry. The ability to increase the polymer solids as a ratio to the total weight of the slurry offers improved treating performance, better logistical benefits and lower logistical and capital costs.

Still another shortcoming of prior drag reducing agent slurries is that the drag reducing agent slurry is not capable of being "re-suspended" should the polymer "separate" from its suspending material. As prior drag reducing agent slurries age, the polymer has a tendency to separate by settling to the bottom or rising to the top of the tank, or other container, containing the drag reducing agent slurry. When this occurs, the polymer further re-agglomerates and cannot be "re-suspended." As such, the drag reducing agent slurry is of no value and new, or "fresh" drag reducing agent slurry is required.

Additionally, none of the prior attempts provide the surprisingly unexpected results of using the suspending materials of the present invention. For instance, the suspending materials of the present invention provide a drag reducing agent slurry that has an increased shelf life, a minimal impact on pipeline and refinery operations, and permit formation of a drag reducing agent slurries having more active polymer per gallon than any other prior drag reducing agent slurries.

Accordingly, prior to the development of the present invention, there has been no drag reducing agent slurry, process for forming a drag reducing agent slurry, or process for reducing drag in a conduit, which: does not negatively impact wastewater treatment facilities; permits longer term storage without biological degradation and temperature destabilization; does not insult motor fuels and other refined products; reduces instances of re-agglomeration; and provides a more stable drag reducing agent slurry during production, transportation, storage, and use. Therefore, the art has sought a drag reducing agent slurry, process for forming a drag reducing agent slurry, and process for reducing drag in a conduit, which: does not negatively impact wastewater treatment facilities; permits longer term storage without biological degradation and temperature destabilization; does not insult motor fuels and other refined products; reduces instances of re-agglomeration; and provides a more stable drag reducing agent slurry during production, transportation, storage, and use.

While various components of drag reducing slurries have been used in connection with certain drag reducing agents, the inventors are not aware of any patents or publications showing alfol alcohols being used as a component of drag reducing agent slurries. For example, U.S. Pat. Nos. 6,172,151; 5,244,937; 5,449,732; 5,504,131; 5,504,132; and 5,539,044 disclose certain components of drag reducing agent slurries, but do not disclose or suggest the alfol alcohols as a component of drag reducing agent slurries.

SUMMARY OF INVENTION

In accordance with the invention, the foregoing advantages have been achieved through the present process for forming a drag reducing agent slurry comprising: forming a drag reducing agent; and mixing the drag reducing agent with at least one alfol alcohol.

A further feature of the process for forming a drag reducing agent slurry is that the alfol alcohol may be selected from the group consisting of 1-pentanol, 1-hexanol, 1-heptanol, n-octyl alcohol, n-nonyl alcohol, and 1-decanol.

In accordance with the invention, the foregoing advantages have also been achieved through the present process for forming a drag reducing agent slurry comprising: contacting alpha olefin monomer with a catalyst in a reactant mixture; polymerizing the alpha olefin monomers, wherein during the polymerization, at least a portion of the alpha olefin monomers polymerize in the reactant mixture to provide a polyalphaolefin; mixing the polyalphaolefin with at least one alfol alcohol.

A further feature of the process for forming a drag reducing agent slurry is that the catalyst may be a transition metal catalyst. Another feature of the process for forming a drag reducing agent slurry is that the transition metal catalyst may be a Ziegler-Natta catalyst. An additional feature of the process for forming a drag reducing agent slurry is that the Ziegler-Natta catalyst may be titanium trichloride. Still another feature of the process for forming a drag reducing agent slurry is that the reactant mixture may include at least one co-catalyst. A further feature of the process for forming a drag reducing agent slurry is that the at least one co-catalyst may be selected from the group consisting of alkylaluminoxanes, halohydrocarbons, diethylaluminum chloride, and dibutylaluminum chloride. Another feature of the process for forming a drag reducing agent slurry is that the alpha olefin monomers may comprise homopolymers, terpolymers or copolymers. An additional feature of the process for forming a drag reducing agent slurry is that the alpha olefin monomers may comprise co-polymers of 1-hexene and 1-dodecene alpha olefins or co-polymers of 1-octene and 1-tetradodecene alpha olefins. Still another feature of the process for forming a drag reducing agent slurry is that the polyalphaolefin may be an ultra-high molecular weight polyalphaolefin having an inherent viscosity of at least about 10 deciliters per gram and may be amorphous with substantially no crystalline particles. A further feature of the process for forming a drag reducing agent slurry is that the process may further comprise the step of cryogrinding the polyalphaolefin prior to mixing the polyalphaolefin with the at least one alfol alcohol. Still another feature of the process for forming a drag reducing agent slurry is that the alfol alcohol may be selected from the group consisting of 1-pentanol, 1-hexanol, 1-heptanol, n-octyl alcohol, n-nonyl alcohol, and 1-decanol.

In accordance with the invention, the foregoing advantages have also been achieved through the present drag reducing agent slurry comprising a polyalphaolefin and at least one alfol alcohol.

A further feature of the drag reducing agent slurry is that the alfol alcohol may be selected from the group consisting of 1-pentanol, 1-hexanol, 1-heptanol, n-octyl alcohol, n-nonyl alcohol, and 1-decanol.

In accordance with the invention, the foregoing advantages have also been achieved through the present drag reducing agent slurry comprising a polyalphaolefin and at least one alfol alcohol formed by mixing the polyalphaolefin with at least one alfol alcohol.

A further feature of the drag reducing agent slurry is that the alfol alcohol may be selected from the group consisting of 1-pentanol, 1-hexanol, 1-heptanol, n-octyl alcohol, n-nonyl alcohol, and 1-decanol.

In accordance with the invention, the foregoing advantages have also been achieved through the present drag reducing agent slurry comprising a polyalphaolefin and at least one alfol alcohol formed by contacting alpha olefin monomers with a catalyst in a reactant mixture; polymerizing the alpha olefin monomers, wherein during the polymerization, at least a portion of the alpha olefin monomers polymerize in the reactant mixture to provide a polyalphaolefin; and mixing the polyalphaolefin with at least one alfol alcohol.

A further feature of the drag reducing agent slurry is that the alfol alcohol may be selected from the group consisting of 1-pentanol, 1-hexanol, 1-heptanol, n-octyl alcohol, n-nonyl alcohol, and 1-decanol.

In accordance with the invention, the foregoing advantages have also been achieved through the present process for reducing drag in a conduit, comprising: forming a drag reducing agent slurry comprising a polyalphaolefin and at least one alfol alcohol; and introducing the drag reducing agent slurry into the conduit.

A further feature of the process for reducing drag in a conduit is that the alfol alcohol may be selected from the group consisting of 1-pentanol, 1-hexanol, 1-heptanol, n-octyl alcohol, n-nonyl alcohol, and 1-decanol.

In accordance with the invention, the foregoing advantages have also been achieved through the present process for reducing drag in a conduit, comprising: forming a drag reducing agent comprising a polyalphaolefin, wherein the drag reducing agent is formed by contacting alpha olefin monomers with a catalyst in a reactant mixture; polymerizing the alpha olefin monomers, wherein during the polymerization, at least a portion of the alpha olefin monomers polymerize in the reactant mixture to provide a polyalphaolefin; mixing the polyalphaolefin with at least one alfol alcohol to form a drag reducing agent slurry; and introducing the drag reducing agent slurry into the conduit.

A further feature of the process for reducing drag in a conduit is that the alfol alcohol may be selected from the group consisting of 1-pentanol, 1-hexanol, 1-heptanol, n-octyl alcohol, n-nonyl alcohol, and 1-decanol.

The drag reducing agent slurry, process for forming a drag reducing agent slurry, and process for reducing drag in a conduit have the advantages of: not negatively impacting wastewater treatment facilities; permitting longer term storage without biological degradation and temperature destabilization; not insulting motor fuels and other refined products; reducing instances of re-agglomeration; and providing a more stable drag reducing agent slurry during production, transportation, storage, and use.

DETAILED DESCRIPTION OF THE INVENTION

The following detailed description refers to certain details and specific aspects of the invention, including specific embodiments and examples of the invention. Also, for purposes of better understanding the invention, certain terms will now be explained and defined. It is to be understood that the invention is not limited or restricted to the specific examples and embodiments described below, which are included to assist a person skilled in the art in practicing the invention. On the contrary, it is intended to cover all alternatives, modifications, and equivalents, as may be included within the spirit and scope of the invention as defined by the appended claims.

The term "drag reducing agent" (DRA) as used herein refers to a composition that includes at least the formed polyalphaolefin polymer. The term "polyalphaolefin" refers to the polymer material formed by the polymerization of alpha olefin monomers, and is broadly construed to include not only the polymer in its final form, but also any intermediate polymers being formed, sometimes referred to as "oligomers." Preferably, the polyalphaolefin polymer is amorphous, i.e., the polyalphaolefin has no crystalline structures, or habits, existing in a single phase with substantially no solid particles, and has an ultra-high molecular weight and inherent viscosity of 10 dL/g or greater.

"Ultra-high molecular weight," means a molecular weight corresponding to an inherent viscosity of at least about 10 dL/g. Because of the extremely high molecular weight of the DRA polymer, it is difficult to reliably and accurately measure the actual molecular weight, but inherent viscosity provides a useful approximation of molecular weight. "Inherent viscosity" is measured using a Cannon-Ubbelohde four bulb shear dilution viscometer (0.05 g polymer/100 ml hexane at 25° C.). Inherent viscosities are calculated for each of the last three bulbs. The viscosities are then plotted as a function of shear rate. The plot is then used to determine the inherent viscosity at a shear rate of 300 sec-1. It is contemplated that an inherent viscosity of 10 dL/g corresponds roughly to a molecular weight of at least about 10 or 15 million. Preferably, the ultra-high molecular weight polyalphaolefins have molecular weights even higher, e.g., greater than 25 million. The polyalphaolefins formed preferably have a narrow molecular weight distribution. Because different assumptions about the properties of the polyalphaolefin can yield different estimates of molecular weights, the inventors prefer using inherent viscosity to characterize the molecular weights of their drag reducing agents.

While the polyalphaolefin polymer may be formed using any method known to persons skilled in the art (e.g., using the methods disclosed in U.S. Pat. Nos. 3,692,676; 4,289,679; 4,358,572; 4,433,123; 4,493,903; 4,493,904; 5,244,937; 5,449,732; 5,504,131; 5,504,132; and 5,539,044, all of which are hereby incorporated by reference), the polyalphaolefin polymer is preferably made in accordance with the methods described in U.S. Pat. Nos. 5,869,570 and 6,015,779, both of which are hereby incorporated by reference. Generally, the polyalphaolefin polymer is formed by contacting alpha olefin monomers, e.g., alpha olefins monomers having 2 to 20 carbon atoms, with a catalyst in a reactant mixture. Homopolymers, copolymers and terpolymers may be used. Preferred alpha olefins include ethylene, propylene, 1-butene, 4-methyl-1-pentene, 1-hexene, 1-octene, 1-decene, 1-dodecene and 1-tetradecene; conjugated or unconjugated dienes such as butadiene and 1,4-hexadiene; aromatic vinyls such as styrene; and cyclic olefins such as cyclobutene. Most preferably, the alpha olefin monomers are co-polymers of 1-hexene and 1-dodecene present in a 1:1 mole ratio; or co-polymers of 1-octene and 1-tetradecene present in a 1:1 mole ratio.

In one preferred embodiment, disclosed in U.S. Pat. No. 6,015,779, alpha olefin monomers are contacted with a catalyst and a co-catalyst system having at least one co-catalyst. While it is contemplated that any catalyst known to persons skilled in the art may be utilized, e.g., metallocene or Ziegler-Natta catalysts, preferred catalysts include transition metal catalysts such as those catalysts containing titanium trichloride, titanium tetrachloride or metallocene or combinations thereof. Preferably, the transition metal catalysts are non-metallocene. Titanium trichloride, which is most preferred, has been used for years in making drag reducing agents, and is preferably used in an amount ranging from at least about 100 to 1500 parts per million (ppm) based on the weight of all the components, i.e., the alpha olefins, co-catalysts, and catalysts supplied to the reactor.

Co-catalysts have also been used for years to form drag reducing agents. It is contemplated that any co-catalyst known to persons skilled in the art may be included with the catalyst; however, preferred co-catalysts includes one or more co-catalyst selected from the group consisting of alkylaluminoxanes, halohydrocarbons, diethylaluminum chloride ("DEAC") and dibutylaluminum chloride ("DIBAC"). As mentioned above, the process of forming the drag reducing agent may include no co-catalyst, one co-catalyst, or a plurality of co-catalysts.

The alpha olefin monomers may be polymerized at an initial temperature at about or less than 25° C., and preferably, at about or less than 10° C., wherein during the polymerization, at least a portion of the alpha olefin monomers polymerize in the reactant mixture to provide a polyalphaolefin. Preferably, the alpha olefin monomers are polymerized at an initial temperature of about −5° C.

In some instances, the polyalphaolefin is cryoground as disclosed in U.S. Pat. Nos. 5,504,131; 5,504,132; and 5,539,044. Additionally, partitioning agents, also known as coating agents, may be, and preferably are, mixed with the polyalphaolefin. Partitioning agents are compositions that help prohibit polyalphaolefin polymer particles from sticking together in large clumps, thereby facilitating the dispersion of the polyalphaolefin in the hydrocarbon in the conduit. The partitioning agents may be added during polymerization and/or during grinding of the polyalphaolefin into fine polymer particles. Partitioning agents are generally known to persons skilled in the art and may be included in the reactant mixture or, alternatively, mixed with the polyalphaolefin after polymerization. Preferred partitioning agents are alpha olefin monomer partitioning agent having 30 to at least about 65 carbons. In an especially preferred embodiment, alpha olefin monomer partitioning agent, i.e., alpha olefin monomers having about 30 to about 65 carbon atoms, is mixed with the polymer prior to adding the suspending material to the polymer/partitioning agent particles.

Drag reducing agent slurries are formed by mixing the drag reducing agent with at least one slurry component or suspending material. Numerous slurry components are known to persons skilled in the art. Examples of suitable slurry components are disclosed in U.S. Pat. Nos. 5,244,937; 5,449,732; 5,504,131; 5,504,132; 5,539,044, all of which are hereby incorporated by reference. An additional slurry component, or suspending material, is at least one alfol alcohol.

In a preferred embodiment, after the polyalphaolefin is formed it is combined, or mixed, preferably under agitation, with at least one alfol alcohol to form a drag reducing agent slurry. Alfol alcohols are straight-chained alcohols that are substantially insoluble, or immiscible, in water. Substantially insoluble, or immiscible, in water is herein defined as having a solubility in water of less than 0.2% by weight of alcohol to water. Additionally, preferably, the alfol alcohol is substantially pure or neat, i.e, contains less than 0.25% of any additional liquid, gas, or solid. Preferred, alfol alcohols of the present invention include 1-pentanol, 1-hexanol, 1-heptanol, n-octyl alcohol, n-nonyl alcohol, and 1-decanol and are commercially available. In the preferred embodiment, 1-hexanol is included in the drag reducing agent slurry.

The alfol alcohol may be present in the drag reducing agent slurry at a concentration in the range from about 40.0% to about 85.0% based upon the weight of alfol alcohol to drag reducing agent slurry. Preferably, the at least one alfol alcohol is mixed with the polyalphaolefin to form a drag reducing agent slurry at a concentration ranging from about 45% to about 55% based upon the weight of alfol alcohol to drag reducing agent slurry.

It has been observed that the inclusion of 1-hexanol as the suspending material provides the added benefit in that should the drag reducing agent slurry separate, i.e., the polyalphaolefin is not no longer uniformly dispersed through out the suspending material such as due to long term settling of the polyalphaolefin with no mixing energy applied, the polyalphaolefin can be re-constituted back to its original suspended state by simply re-applying mixing energy, i.e., applying an agitator.

Another surprising and advantageous result of including 1-hexanol as the suspending material is that 1-hexanol, and presumably other alfol alcohols, demonstrates unique particle wetting characteristics on the polymer/partitioning agent particles. This preferential oil soluble surface wetting of discrete polymer/partitioning agent particles facilitates the prevention of re-agglomeration of the polymer/partitioning agent particles which would produce an unusable drag reducing agent slurry. Further, and unexpectedly, the wetted polymer/partitioning agent particles demonstrate an improvement in the ability of the polymer/partitioning agent particles to dissolve in petroleum streams and become functional, and thus provide drag reducing, much faster after introduction into the hydrocarbon stream.

Still another surprising and advantageous result of including 1-hexanol as the suspending material is that 1-hexanol, and presumably other alfol alcohols, permit increased percentages of polymer per gallon of suspending material. As noted previously, the highest known ratio of polymer to suspending agent is approximately 2.0 pounds of polymer per gallon of suspending agent. Using a polymer formed in accordance with the process disclosed in U.S. Pat. No. 6,015,779 and combined with $C_{30}+$ alpha olefin monomer partitioning agent (purchased from Chevron-Phillips), polymer/partitioning agent particles were formed by cryogrinding and were combined with 1-hexanol (45 g polymer/partitioning agent to 65 grams of 1-hexanol). A stable drag reducing agent slurry was formed having a ratio of polymer to suspending agent of 2.5 pounds per gallon, and in one specific example, 2.8 pounds per gallon. These results represent a 25% and, in at least one case, a 28% increase over prior drag reducing agent slurries that translates into an increase of drag reduction capability with less volume of drag reducing agent slurry.

Additionally, the drag reducing agent slurries of the present invention provided a longer shelf life than prior drag reducing agent slurries. Several samples of drag reducing agent slurries were prepared using the polymer formed using the process disclosed in U.S. Pat. No. 6,015,779. After the polymer was formed, it was combined with $C_{30}+$ alpha olefin monomer partitioning agent and cryoground. The cryoground polymer/partitioning agent particles were then combined with the suspending agents listed in TABLE I at a concentration of 45 grams of polymer/partitioning agent particles to 65 grams of suspending material. Therefore, the only difference between each example is that different suspending materials were selected.

Each drag reducing agent slurry sample was then allowed to set for 30 days at 75° C. without any agitation. After 30 days, each sample was analyzed to determine whether the sample had re-agglomerated, and thus, had become unusable. The results are shown in TABLE I.

TABLE I

| Suspending Material | Slurry State after 30 days at 75° C. (No agitation) |
| --- | --- |
| Ethanol | Separation/Severe re-agglomeration |
| Ethanol-Water Mixture (50 vol./50 vol.) | Separation/Severe re-agglomeration |
| Butanol (Neat) | Separation/Severe re-agglomeration |
| Butanol-Water Mixture (50 vol./50 vol.) | Separation/Severe re-agglomeration |
| Methanol (Neat) | Separation/Severe re-agglomeration |
| Methanol-Water Mixture (50 vol./50 vol.) | Separation/Severe re-agglomeration |
| Isopropanol (Neat) | Separation/Re-agglomeration |
| Isopropanol-Water Mixture (50 vol./50 vol.) | Separation/Severe re-agglomeration |
| 1-Hexanol (Neat) | Slight Separation/No re-agglomeration |

As shown in TABLE I, only the drag reducing agent slurries containing 1-hexanol (Neat) showed no re-agglomeration after 30 days. While this sample showed slight separation, because there was no re-agglomeration, this sample was capable of being re-suspended, and thus, was still usable after 30 days. The other drag reducing agent slurries, all of which are prior drag reducing agent slurries, all separated and re-agglomerated. In fact, in all but one of the samples, the drag reducing agents severely re-agglomerated. As a result, none of these samples were suitable as drag reducing agent slurries after 30 days at 75° C.

Drag reducing agent slurries comprising a drag reducing agent and at least one alfol alcohol may be used to reduce drag in a conduit by adding the drag reducing agent slurry to a conduit containing a hydrocarbon. Additionally, the drag reducing agent slurry comprising at least one alfol alcohol may also be further processed by any method known to those skilled in the art to be utilized to reduce drag in a conduit.

It is to be understood that the invention is not limited to the exact details of construction, operation, exact materials, or embodiments shown and described, as obvious modifications and equivalents will be apparent to one skilled in the art. Accordingly, the invention is therefore to be limited only by the scope of the appended claims.

What is claimed is:

1. A process for forming a nonaqueous drag reducing agent slurry comprising:
   forming a polyalphaolefin;
   cryogrinding the polyalphaolefin to form a cryoground polyalphaolefin; and
   mixing the cryoground polyalphaolefin with at least one alfol alcohol.

2. The process for forming a nonaqueous drag reducing agent slurry of claim 1, wherein the at least one alfol alcohol is selected from the group consisting of 1-pentanol, 1-hexanol, 1-heptanol, n-octyl alcohol, n-nonyl alcohol and 1-decanol.

3. A process for forming a nonaqueous drag reducing agent slurry comprising:
   contacting alpha olefin monomer with a catalyst in a reactant mixture;
   polymerizing the alpha olefin monomers, wherein during the polymerization, at least a portion of the alpha olefin monomers polymerize in the reactant mixture to provide a polyalphaolefin;
   cryogrinding the polyalphaolefin to form a cryoground polyalphaolefin; and
   mixing the cryoground polyalphaolefin with at least one alfol alcohol.

4. The process for forming a nonaqueous drag reducing agent slurry of claim 3, wherein the catalyst is a transition metal catalyst.

5. The process for forming a nonaqueous drag reducing agent slurry of claim 3, wherein the transition metal catalyst is a Ziegler-Natta catalyst.

6. The process for forming a nonaqueous drag reducing agent slurry of claim 3, wherein the Ziegler-Natta catalyst is titanium trichioride.

7. The process for forming a nonaqueous drag reducing agent slurry of claim 3, wherein the reactant mixture includes at least one co-catalyst.

8. The process for forming a nonaqueous drag reducing agent slurry of claim 7, wherein the at least one co-catalyst is selected from the group consisting of alkylaluminoxanes, halohydrocarbons, diethylaluminum chloride, and dibutylaluminum chloride.

9. The process for forming a nonaqueous drag reducing agent slurry of claim 3, wherein the alpha olefin monomer includes at least one of 1-hexene, 1-octene, 1-decene, 1-dodecene, or mixtures thereof.

10. The process for forming a nonaqueous drag reducing agent slurry of claim 3, wherein the alpha olefin monomer includes a combination of 1-hexene and 1-dodecene alpha olefin monomers or a combination of 1-octene and 1-tetradodecene alpha olefin monomers.

11. The process for forming a nonaqueous drag reducing agent slurry of claim 3, wherein the polyalphaolefin is an ultra-high molecular weight polyalphaolefin having an inherent viscosity of at least about 10 deciliters per gram and is amorphous with substantially no crystalline particles.

12. The process for forming a nonaqueous drag reducing agent slurry of claim 3, wherein the at least one alfol alcohol is selected from the group consisting of 1-pentanol, 1-hexanol, 1-heptanol, n-octyl alcohol, n-nonyl alcohol and 1-decanol.

13. A nonaqueous drag reducing agent slurry comprising a cryoground polyalphaolefin and at least one alfol alcohol.

14. The nonaqueous drag reducing agent slurry of claim 13, wherein the at least one alfol alcohol is selected from the group consisting of 1-pentanol, 1-hexanol, 1-heptanol, n-octyl alcohol, n-nonyl alcohol and 1-decanol.

15. A nonaqueous drag reducing agent slurry comprising a cryoground polyalphaolefin and at least one alfol alcohol formed by mixing the cryoground polyalphaolefin with at least one alfol alcohol.

16. The nonaqueous drag reducing agent slurry of claim 15, wherein the at least one alfol alcohol is selected from the group consisting of 1-pentanol, 1-hexanol, 1-heptanol, n-octyl alcohol, n-nonyl alcohol and 1-decanol.

17. A nonaqueous drag reducing agent slurry comprising a cryoground polyalphaolefin and at least one alfol alcohol formed by contacting alpha olefin monomers with a catalyst in a reactant mixture;
   polymerizing the alpha olefin monomers, wherein during the polymerization, at least a portion of the alpha olefin monomers polymerize in the reactant mixture to provide a polyalphaolefin;
   cryogrinding the polyalphaolefin to form the cryoground polyalphaolefin; and
   mixing the cryoground polyalphaolefin with at least one alfol alcohol.

18. The process for forming a nonaqueous drag reducing agent slurry of claim 17, wherein the at least one alfol alcohol is selected from the group consisting of 1-pentanol, 1-hexanol, 1-heptanol, n-octyl alcohol, n-nonyl alcohol and 1-decanol.

19. A process for reducing drag in a conduit, comprising:
  forming a nonaqueous drag reducing agent slurry comprising a cryoground polyalphaolefin and at least one alfol alcohol; and
  introducing the nonaqueous drag reducing agent slurry into the conduit.

20. The process reducing drag in a conduit of claim 19, wherein the at least one alfol alcohol is selected from the group consisting of 1-pentanol, 1-hexanol, 1-heptanol, n-octyl alcohol, n-nonyl alcohol and 1-decanol.

21. A process for reducing drag in a conduit, comprising:
  forming a drag reducing agent comprising a polyalphaolefin, wherein the drag reducing agent is formed by contacting alpha olefin monomers with a catalyst in a reactant mixture;
  polymerizing the alpha olefin monomers, wherein during the polymerization, at least a portion of the alpha olefin monomers polymerize in the reactant mixture to provide a polyalphaolefin;
  cryogrinding the polyalphaolefin to form a cryoground polyalphaolefin; mixing the cryoground polyalphaolefin with at least one alfol alcohol to form a nonaqueous drag reducing agent slurry; and
  introducing the nonaqueous drag reducing agent slurry into the conduit.

22. The process for reducing drag in a conduit of claim 21, wherein the at least one alfol alcohol is selected from the group consisting of 1-pentanol, 1-hexanol, 1-heptanol, n-octyl alcohol, n-nonyl alcohol and 1-decanol.

* * * * *

UNITED STATES PATENT AND TRADEMARK OFFICE
CERTIFICATE OF CORRECTION

PATENT NO. : 7,012,046 B2 Page 1 of 1
APPLICATION NO. : 09/877341
DATED : March 14, 2006
INVENTOR(S) : Gerald B. Eaton and Alan K. Ebert It is certified that error appears in the above-identified patent and that said Letters Patent is hereby corrected as shown below:

Column 8,
Line 66, change "75°C" to -- 75°F --.

Column 9,
Line 6, Table I, change "75°C" to -- 75°F --.
Line 30, change "75°C" to -- 75°F --.

Signed and Sealed this

Twenty-seventh Day of June, 2006

JON W. DUDAS
*Director of the United States Patent and Trademark Office*